Figure 1:
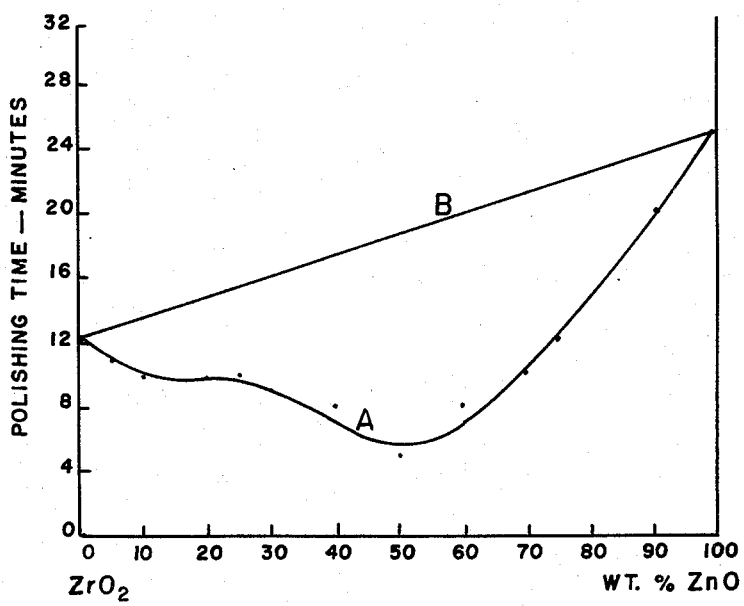

Oct. 4, 1960  J. L. BLITON ET AL  2,955,031
GLASS POLISHING COMPOSITIONS
Filed Feb. 25, 1959  2 Sheets-Sheet 1

INVENTOR
JERALD L. BLITON
WILLIAM J. BALDWIN

BY
ATTORNEY

Oct. 4, 1960

J. L. BLITON ET AL 2,955,031

GLASS POLISHING COMPOSITIONS

Filed Feb. 25, 1959

2 Sheets-Sheet 2

INVENTOR
JERALD L. BLITON
WILLIAM J. BALDWIN

BY *Ashlan T. Harlan Jr*

ATTORNEY

United States Patent Office 2,955,031
Patented Oct. 4, 1960

2,955,031

GLASS POLISHING COMPOSITIONS

Jerald L. Bliton, Niagara Falls, and William J. Baldwin, Amherst, N.Y., assignors to National Lead Company, New York, N.Y., a corporation of New Jersey Filed Feb. 25, 1959, Ser. No. 795,447

10 Claims. (Cl. 51—309)

The invention of the present application relates to polishing compositions and particularly to such compositions as are useful for the polishing of glass.

It is an object of the invention to provide glass polishing compositions comprising a plurality of ingredients which are more effective than the ingredients by themselves.

Another object of the invention is to provide glass polishing compositions of the character described which have a high polishing efficiency.

Another object of the invention is to provide glass polishing compositions of the character described which are inexpensive and easily prepared.

A further object of the invention is to provide, for use in glass polishing compositions, materials which reduce the cost of such compositions while at the same time retaining or improving the polishing efficiency.

Still another object of the invention is to provide a novel process for polishing glass.

Other objects and advantages of the invention will be apparent from the following description thereof.

Hitherto many materials have been used as polishing agents for obtaining smooth surfaces on glass articles such as lenses and the like. Conventionally, these polishing agents are applied as an aqueous slurry to the work while a pad of felt or similar somewhat resilient, flexible material is used to rub the polishing agent over the glass surface to be polished. Among the most efficient polishing agents for glass hitherto used are zirconium dioxide ($ZrO_2$) and ceric oxide ($CeO_2$).

It has now been discovered that by mixing with certain oxidic glass polishing agents, including finely divided zirconia and ceria, one or more of a number of other oxidic materials in finely divided form there are obtained glass polishing compositions that have much greater efficiency, as measured by the times required for polishing with them. This is more fully described in the following example which sets out a preferred example of the novel compositions with which the present invention is concerned.

EXAMPLE 1

A mixture of 50% $ZrO_2$ and 50% zinc oxide was made by thoroughly blending the two materials in finely divided form. The mixture was then employed in the polishing of flat lens blanks of optical crown glass which had been previously ground to a finish of 10–11 micro-inches. The polishing machine used was a continuous feed, bowl type polisher with a spindle speed of about 550 r.p.m. A conventional soft felt polishing pad was employed and a pressure of 6 p.s.i. was used with an aqueous slurry of the above-mentioned mixture containing 10% solids being fed continuously onto the pad.

A number of tests were run. Polishing in each case was carried on until, as determined by inspection with a 75× microscope, no more than 350 pits per sq. in. were observable on the lens surface. It was found that the average time required to obtain this degree of polish, regarded as acceptable by lens makers, was only 5 minutes. This is much less than the 12 minute time required to attain the same degree of polish using $ZrO_2$ alone and is, of course, far less than the time—over 25 minutes—required with zinc oxide alone.

Numerous other lens polishing tests carried out in the same way have demonstrated that mixtures of zirconia and zinc oxide in other ratios also show improved polishing efficiency. The results of these tests and those described in Example 1 are shown graphically in Figure 1 of the accompanying drawing. It will be seen that all points on the curve "A" representing the polishing times of mixtures of $ZrO_2$ and zinc oxide fall below the parameter established by the straight line "B" passing through the times required for the same degree of polishing with the two constituents separately.

It is to be noted in Figure 1 that 25 minutes has been arbitrarily taken as the time required for polishing with zinc oxide alone. Actually, zinc oxide when used by itself has so little polishing action on glass that the time required to achieve the predetermined degree of polish is much greater than 25 minutes. The same thing is true of certain other of the additive compounds hereinafter referred to and, with respect to those compounds also, 25 minutes has been arbitrarily chosen as their time of polishing for purposes of determining the parameter lines of the systems of polishing compositions incorporating them. For convenience in reference a line joining the polishing times (either real or the arbitrarily selected maximum of 25 minutes) of two substances in a graphical chart like that shown in Figure 1 is hereinafter called a "polishing time parameter."

Results similar to those with mixtures of zirconia and zinc oxide shown in Figure 1 have been obtained in glass polishing tests with mixtures of zirconia and certain other monoxides of metals of groups IIB and IVA of the periodic series of elements, as set forth in the periodic table given in "Fundamental Chemistry" (2d Ed.), by H. G. Deming, pub. by John Wiley & Sons, Inc. (It is to the periodic series as shown in this table that reference is made in the appended claims.) These tests and their results are described in the following examples:

EXAMPLE 2

Lens polishing tests were carried out in the same manner as described in Example 1 using as polishing compositions mixtures of finely divided zirconia as polishing agent and powdered cadminum oxide (CdO) as additive. It was found that separately $ZrO_2$ and CdO required, respectively, 12 minutes and in excess of 25 minutes to attain the predetermined degree of polish described in conjunction with Example 1. However, with polishing compositions consisting of mixtures of the two materials considerably less time was required to obtain the same degree of polish. Such a mixture containing 15% of CdO required only 5 minutes; while other mixtures containing, respectively, 7% and 25% of CdO required only 6 minutes and 7 minutes.

EXAMPLE 3

Lens polishing tests were also carried out in the same manner as described in Example 1 using as polishing compositions mixtures of powdered $ZrO_2$ as a polishing agent and powdered lead oxide (PbO) as the additive. Although the lead oxide had substantially no polishing action even when used for periods in excess of 25 minutes, it was found that when employing a mixture containing 25% PbO, only 6 minutes of polishing was required to obtain the same degree of polish as was obtained in 12 minutes with ZrO alone. In other similar tests, the same degree of polish was secured in 7 minutes and in 10 minutes by the use of polishing compositions consisting of mixtures of $ZrO_2$ and PbO containing 15% and 50%, respectively, of PbO.

Figure 2:
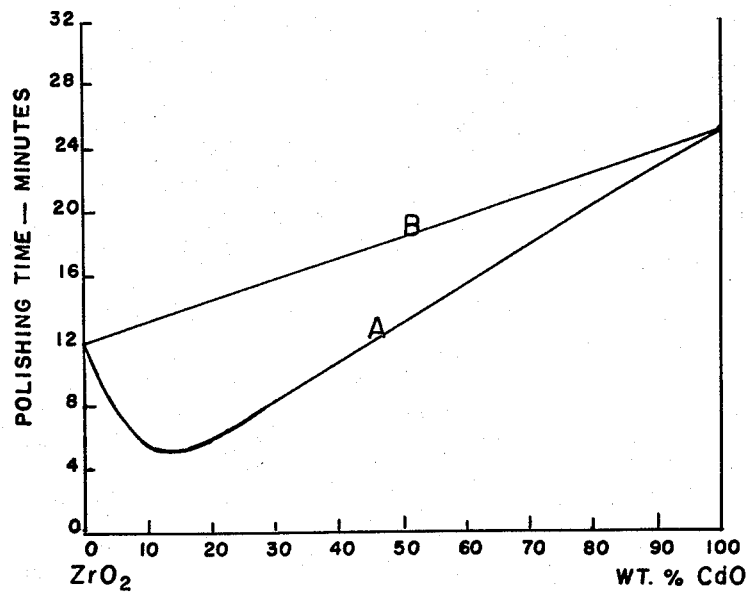
Figure 3:
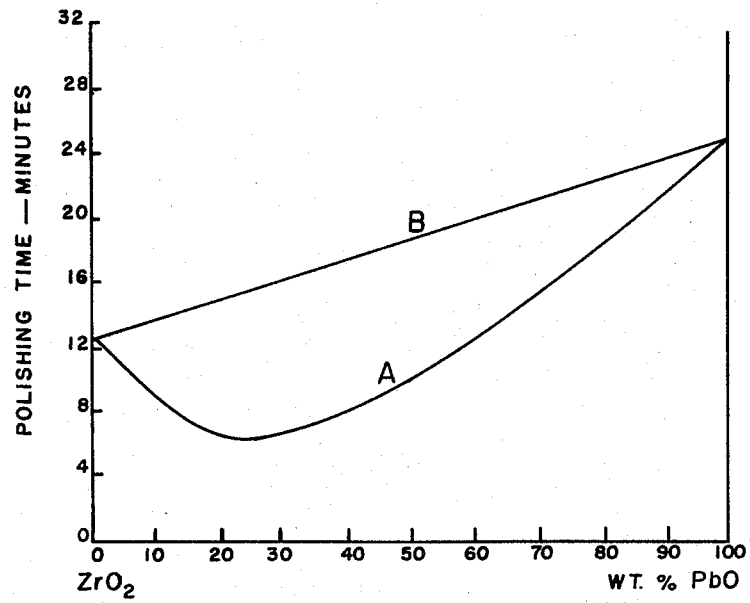

Figures 2 and 3, respectively, show graphically the results of the tests described in Examples 2 and 3. It will be seen from these figures that, like the tests with compositions consisting of mixtures of $ZrO_2$ and zinc oxide results of which are illustrated in Figure 1, the curves "A" representing the polishing times of the mixtures fall in both cases below the polishing time parameters identified as lines "B."

It has also been found that glass polishing compositions with relatively high efficiencies are obtained when the metallic monoxides ZnO, CdO, and PbO are used as additives and mixed with other known oxidic glass polishing agents. Such polishing agents include ceric oxide ($CeO_2$), rouge ($Fe_2O_3$), alumina ($Al_2O_3$), titania ($TiO_2$), stannic oxide ($SnO_2$), and silica ($SiO_2$). Lens polishing tests like those of Example 1 in which polishing compositions consisting of mixtures of the mentioned monoxide additives with these oxidic polishing agents were used have shown in all cases that the times on the polishing time parameters for the systems of the mixtures which correspond to the compositions of the mixtures are greater than the actual polishing times required when using the mixtures. Accordingly, it appears, as illustrated in Figure 1 with respect to the $ZrO_2$—ZnO system, that compositions including from about 10%–90% of additive are useful. In many cases the polishing time required with a mixture is less than that required to obtain the same degree of polish with either of the constituents of the mixture when used by itself.

Figure 4:
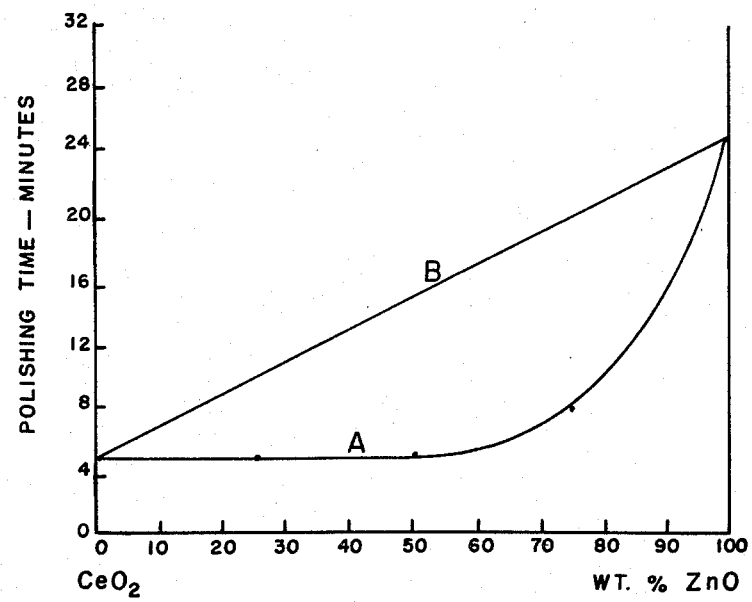

The results of a number of lens polishing tests with mixtures of ceria as polishing agent and zinc oxide as additive are shown graphically in Figure 4. It will be seen that the polishing times of these mixtures as represented by the curve "A" are below the polishing time parameter indicated by the line "B." It will also be evident that with mixtures containing as much as 50% zinc oxide the polishing times required are as low as the polishing time required with ceria alone. Since ceria is quite expensive and zinc oxide cheap, great savings in polishing costs are therefore possible.

Further, in the following table there are set forth a number of examples of increased polishing efficiency resulting from the use of other mixtures of one or more known oxidic glass polishing agents of the group consisting of $ZrO_2$, $CeO_2$, $Fe_2O_3$, $Al_2O_3$, $TiO_2$, $SnO_2$, and $SiO_2$ with one or more additives selected from the group of monoxides of metals of groups IIB and IVA of the periodic series of elements (as depicted on the chart referred to above) which consists of ZnO, CdO and PbO. It is apparent from the test results shown in the table that the use of such mixtures produces unexpected results in glass polishing. The table also sets out the results of tests using as polishing compositions mixtures of such polishing agents with certain other oxidic compounds also found to be useful in improving the polishing efficiency of such agents. The polishing times set out in Table A were obtained by using the polishing procedure described above in Example 1.

Glass polishing compositions in accordance with the present invention have a wide usefulness. Not only may they be advantageously employed in lens polishing as illustrated in the foregoing examples, but they may also be used in the polishing of other glass articles such as television tube face plates and prisms and in the polishing of plate glass. Although the tests described herein were carried out with a soft polishing pad, it has been found by further tests that polishing compositions according to the invention also exhibit high polishing efficiency when hard polishing pads are used. For example, when zirconia and ceria were used separately as polishing materials with hard polishing pads the times required for attaining a predetermined degree of polish on ground glass discs were found to be approximately 50% greater than the respective times required to obtain the same degree of polish using as polishing compositions Table A

| Ingredients | Polishing Time of Ingredients Separately, minutes | Polishing Composition, percent | Polishing Time of Composition, minutes |
|---|---|---|---|
| $CeO_2$ | 5 | 50 | 9 |
| PbO | 25+ | 50 | |
| Rouge ($Fe_2O_3$) | 16 | 50 | 9 |
| ZnO | 25+ | 50 | |
| $Al_2O_3$ | 25+ | 60 | 15 |
| ZnO | 25+ | 40 | |
| $TiO_2$ | 11 | 50 | 10 |
| ZnO | 25+ | 50 | |
| $SnO_2$ | 25+ | 50 | 8 |
| ZnO | 25+ | 50 | |
| $SiO_2$ | 22 | 50 | 9 |
| ZnO | 25+ | 50 | |
| $ZrO_2$ | 12 | 50 | 9 |
| $Zn_2TiO_4$ | 20 | 50 | |
| $ZrO_2$ | 12 | 40 | 7 |
| $Zn_2TiO_4$ | 20 | 60 | |
| $ZrO_2$ | 12 | 25 | 7 |
| $Zn_2TiO_4$ | 20 | 75 | |
| $ZrO_2$ | 12 | 33.3 | 8 |
| $TiO_2$ | 11 | 66.6 | |
| $ZrO_2$ | 12 | 50 | 9 |
| Rouge ($Fe_2O_3$) | 16 | 50 | |
| $ZrO_2$ | 12 | 64.5 | 9 |
| $Al_2O_3$ | 25+ | 35.5 | |
| $ZrO_2$ | 12 | 62.5 | 6 |
| ZnO | 25+ | 25 | |
| PbO | 25+ | 12.5 | |
| $ZrO_2$ | 12 | 68.75 | |
| PbO | 25+ | 18.75 | |
| ZnO | 25+ | 12.5 | |
| $ZrO_2$ | 12 | 25 | 7 |
| Rouge ($Fe_2O_3$) | 16 | 25 | |
| ZnO | 25+ | 50 | |
| $ZrO_2$ | 12 | 25 | |
| $SiO_2$ | 22 | 25 | 7 |
| ZnO | 25+ | 30 | |
| PbO | 25+ | 20 | |
| $ZrO_2$ | 12 | 25 | 6 |
| $CeO_2$ | 5 | 25 | |
| ZnO | 25+ | 50 | | mixtures consisting of 50% $ZrO_2$–50% ZnO and 50% $CeO_2$–50% ZnO.

It has also been found that when using polishing compositions according to the invention there is less likelihood of "orange-peeling" on the glass surfaces. Orange-peeling is sometimes encountered when using zirconia as a polishing agent with a soft pad. Both cadmium and zinc oxides when used as additives with zirconia in glass polishing compositions reduce the tendency toward orange-peeling. For example, when as little as 10% zinc oxide is used with the zirconia there is no observable orange-peeling and the polishing time required is, at the same time, reduced.

The polishing agents and additives with which the present invention is concerned are, of course, very finely divided since the presence in a polishing composition of a substantial number of particles having an average diameter greater than about 5 microns is likely to result in producing scratches on the glass surface being polished. In general, a particle size below about 3 microns average diameter is desired and it is preferred that most of the particles have average diameters not greater than about 2 microns.

In preparing glass polishing compositions according to the present invention the materials used need not be of the highest degree of purity since small amounts of impurities affect the results only in degree if at all. As examples of this it has been observed that polishing compositions containing large amounts of $SiO_2$ (which is a common impurity in zirconia) with zirconia and additives have relatively low polishing times. It may also be noted that good results have been obtained not only with high purity $CeO_2$ but also with a grade of $CeO_2$, sold commercially for glass polishing, that contains substantial quantities of other oxides. It should further be noted that, if desired, certain of the ingredients of the glass polishing compositions according to the invention may for convenience be calcined together and then pulverized to the desired degree of fineness. In view of the foregoing, references in the claims to compositions consisting essentially of mixtures of glass polishing agents and additives are to be so interpreted as not to exclude compositions containing small amounts of impurities or compositions which consist of or include precalcined mixtures.

It will be understood that the polishing compositions of the present invention may be employed in any desired and suitable liquid suspending medium. As indicated above, water alone produces good results as a suspending medium, but liquid media containing deflocculants, thickeners, and the like may also be used. It will also be understood that the polishing agents and additive oxides described above may be mixed together in proportions other than those specifically described to produce polishing compositions in accordance with the present invention. As will be apparent from the foregoing description and the drawings, the fact that the polishing times required with such mixtures are below the polishing time parameters makes it possible to produce hitherto unobtainable results which may include exceptionally rapid polishing, reduction in costs, and avoidance of orange-peeling. Accordingly, it is intended that the present invention be interpreted broadly.

All percentages referred to above and in the appended claims are percentages by weight.

We claim:

1. A composition adapted for use in liquid suspension in polishing glass which consists essentially of a mixture of an oxidic glass polishing agent and an additive, said polishing agent being at least one finely divided oxide selected from the group consisting of zirconia, ceria, titania, alumina, ferric oxide, stannic oxide and silica and including a substantial amount of at least one of the first three members of said group and said additive being at least one finely divided oxide selected from the group of monoxides of metals of groups IIB and IVA of the periodic series consisting of ZnO, CdO and PbO, said polishing agent and said additive constituting, respectively, from about 90% to 10% and from about 10% to 90% of said composition, exclusive of impurities.

2. A composition as set forth in claim 1 in which said polishing agent includes zirconia.

3. A composition as set forth in claim 1 in which said polishing agent includes ceria.

4. A composition as set forth in claim 1 in which said polishing agent includes titania.

5. A composition as set forth in claim 2 in which said additive includes ZnO.

6. A composition as set forth in claim 3 in which said additive includes ZnO.

7. A composition as set forth in claim 4 in which said additive includes ZnO.

8. A composition as set forth in claim 1 in which a major portion of said polishing agent is zirconia and a major portion of said additive is ZnO.

9. A composition as set forth in claim 1 in which a major portion of said polishing agent is ceria and a major portion of said additive is ZnO.

10. A composition as set forth in claim 1 in which a major portion of said polishing agent is titania and a major portion of said additive is ZnO.

References Cited in the file of this patent

UNITED STATES PATENTS

| | | |
|---|---|---|
| 876,447 | Findon | Jan. 14, 1908 |
| 2,396,398 | Turbett | Mar. 12, 1946 |
| 2,554,070 | Stead | May 22, 1951 |
| 2,653,080 | Stephens | Sept. 22, 1953 |
| 2,654,194 | Raab | Oct. 6, 1953 |
| 2,744,001 | Harman et al. | May 1, 1956 |

FOREIGN PATENTS

| | | |
|---|---|---|
| 365,273 | Germany | Sept. 21, 1918 |